(12) United States Patent
Park et al.

(10) Patent No.: US 12,498,119 B2
(45) Date of Patent: Dec. 16, 2025

(54) ELECTRIC RANGE

(71) Applicant: LG ELECTRONICS INC., Seoul (KR)

(72) Inventors: Myoeng Soo Park, Seoul (KR); Junghyeon Cho, Seoul (KR); Ji Won Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 823 days.

(21) Appl. No.: 17/826,527

(22) Filed: May 27, 2022

(65) Prior Publication Data

US 2022/0381437 A1    Dec. 1, 2022

(30) Foreign Application Priority Data

May 28, 2021   (KR) .................. 10-2021-0069399

(51) Int. Cl.
  *F24C 7/06*     (2006.01)
  *F24C 15/00*    (2006.01)
  *H05B 6/12*     (2006.01)

(52) U.S. Cl.
  CPC ............ *F24C 7/067* (2013.01); *F24C 15/006* (2013.01); *H05B 6/1263* (2013.01)

(58) Field of Classification Search
  CPC ...... F24C 15/006; F24C 15/101; F24C 7/067; F24C 15/108; H05B 6/1263; H05B 6/06; H05B 6/42
  USPC ........................................ 219/623, 632, 677
  See application file for complete search history.

(56) References Cited

U.S. PATENT DOCUMENTS

| | | | |
|---|---|---|---|
| 10,980,156 B2 | 4/2021 | Kim et al. | |
| 2008/0142512 A1* | 6/2008 | Kim | F24C 15/101 219/757 |
| 2009/0183865 A1* | 7/2009 | Miyahara | H01L 23/467 165/47 |
| 2012/0026680 A1* | 2/2012 | Ke | G06F 1/20 361/695 |

(Continued)

FOREIGN PATENT DOCUMENTS

| | | |
|---|---|---|
| EP | 2498574 | 9/2012 |
| EP | 3628931 A1 * | 4/2020 |
| ES | 2447690 | 3/2014 |

(Continued)

OTHER PUBLICATIONS

English translation to JP 2019153491A (Year: 2019).*

(Continued)

*Primary Examiner* — Sang Y Paik
*Assistant Examiner* — Bonita Khlok
(74) *Attorney, Agent, or Firm* — KED & ASSOCIATES

(57) ABSTRACT

An electric range may include a case, a cover plate coupled to an upper end of the case and on an upper surface of which an object to be heated is placed, a heat sink, an air blowing fan, wherein the air blowing fan is configured to discharge air toward the heat sink, and an air guide that communicates with the air blowing fan, surrounds the heat sink, and forms a flow path of air that cools the heat sink, wherein the air guide includes an side outlet formed in a portion at which the air guide communicates with the air blowing fan, and wherein the air guide is configured to discharge a portion of air flowing from the air blowing fan outward.

12 Claims, 12 Drawing Sheets

(56) References Cited

U.S. PATENT DOCUMENTS

2016/0323938 A1    11/2016  Leonardi et al.
2018/0098414 A1*  4/2018  Davare ................ H05K 1/0206

FOREIGN PATENT DOCUMENTS

| JP | 2019-153491 | | 9/2019 |
| JP | 2019153491 A | * | 9/2019 |
| KR | 10-2009-0121790 | | 11/2009 |
| KR | 10-1307594 | | 9/2013 |

OTHER PUBLICATIONS

English translation to EP3628931A1 (Year: 2020).*
European Search Report dated Oct. 20, 2022 issued in Application No. 22176072.1.
Korean Office Action issued in Application No. 10-2021-0069399 dated Jun. 20, 2025.

* cited by examiner

ELECTRIC RANGE

CROSS-REFERENCE TO RELATED APPLICATION(S)

This application claims priority to and benefit of Korean Patent Application No. 10-2021-0069399, filed in Korea on May 28, 2021, which is hereby incorporated by reference as if fully set forth herein.

BACKGROUND

Field

An electric range, and in particular, an electric range having structure capable of cooling an inside of the electric range effectively.

2. BACKGROUND

Details in the background section do not constitute prior art but are given only as background information concerning the subject matter of the present disclosure.

Various types of cooking appliances are used to heat food or other items (hereinafter, collective "food") at homes or restaurants. Cooking appliances include gas ranges using gas and electric ranges using electricity.

Electric ranges are classified as resistance heating-type electric ranges and induction heating-type electric ranges. In terms of electrical resistance heating, electric current is supplied to a metallic resistance wire or a non-metallic heat generating element, such as silicon carbide, to generate heat, and the generated heat is radiated or conducted to heat an object to be heated, for example, a cooking container, such as a pot, or a frying pan, for example. In terms of induction heating, high-frequency power is supplied to a coil to generate a magnetic field around the coil, and eddy current produced in the generated magnetic field is used to heat an object to be heated made of a metallic material.

In basic theories of induction heating, when electric current is supplied to a working coil or a heating coil, heat is generated while an object to be heated is heated based on induction heating, and the object to be heated is heated by the generated heat. An electric range that operates based on induction heating is disclosed in KR Patent No. 10-1307594, which is hereby incorporated by reference.

In the above-mentioned patent, a printed circuit board that controls operations of the electric range is mounted on the electric range. To suppress overheating of the printed circuit board, a heat sink that cools heat generating elements producing relatively large amounts of heat can be disposed on the printed circuit board.

An air blowing fan is disposed in a position adjacent to the heat sink to cool the heat sink, and an air guide that guides a flow of air discharged from the air blowing fan is provided to cover the heat sink. Additionally, the air guide and the air blowing fan communicate with each other.

The heat generating elements disposed in an air flow space in the air guide can be effectively cooled by air blown by the air blowing fan. Additionally, various types of elements are mounted on the printed circuit board outside of the air guide. As the electric range operates, heat is generated in the elements, heating the printed circuit board entirely.

In an ordinary electric range, air flowing in the flow space of the air guide does not flow to the printed circuit board outside of the air guide. Thus, the air blown by the air blowing fan cannot be used to cool the portion of the printed circuit board outside of the air guide. These problems need to solve.

An electric range of another embodiment may include a case, a cover plate coupled to an upper end of the case and on an upper surface of which an object to be heated is placed, a heat sink, an air blowing fan, wherein the air blowing fan is configured to discharge air toward the heat sink, and an air guide that communicates with the air blowing fan, surrounds the heat sink, and forms a flow path of air that cools the heat sink, wherein the air guide includes an side outlet formed in a portion at which the air guide communicates with the air blowing fan, and wherein the air guide is configured to discharge a portion of air flowing from the air blowing fan outward.

The air guide may include a first area in communication with the air blowing fan and configured to guide air to flow in a lateral direction of the base bracket, a second area configured to guide air to be discharged outward, a third area that extends from the first area and changes a flow direction of air having passed through the first area, and a fourth area that extends from the third area, communicates with the second area, and changes a flow direction of air having passed through the third area.

BRIEF DESCRIPTION OF THE DRAWINGS

Embodiments will be described in detail with reference to the following drawings in which like reference numerals refer to like elements, and wherein.

DETAILED DESCRIPTION

Figure 1:
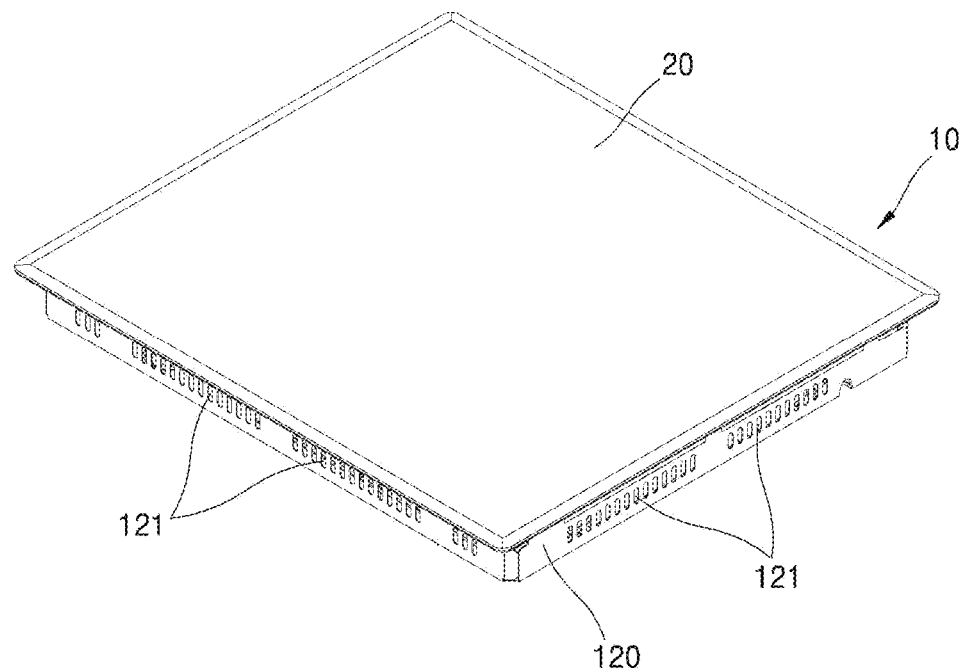
FIG. 1 is a perspective view of an electric range according to an embodiment.

Aspects, features, and advantages are described hereunder with reference to the accompanying drawings such that one having ordinary skill in the art to which embodiments pertain can embody the technical spirit easily. Hereinafter, description of known technologies in relation to the disclosure is omitted if it is deemed to make the gist unnecessarily vague. Hereinafter, embodiments are described with reference to the accompanying drawings. In the drawings, identical reference numerals can denote identical or similar components.

The terms "first", and "second", for example, are used herein only to distinguish one component from another component. Thus, the components should not be limited by the terms. Certainly, a first component can be a second component unless stated to the contrary.

Throughout, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "include" for example, set forth herein, are not interpreted as necessarily including all the stated components or steps but can be interpreted as excluding some of the stated components or steps or can be interpreted as including additional components or steps.

Throughout, the terms "A and/or B" as used herein can denote A, B or A and B, and the terms "C to D" can denote C or greater and D or less, unless stated to the contrary.

Throughout, an "upward-downward direction" denotes an upward-downward direction of an electric range in a state in which the electric range is installed for use. A "leftward-rightward direction" denotes a direction orthogonal to the upward-downward direction, and a "frontward-rearward direction" denotes a direction orthogonal to the upward-downward direction and the leftward-rightward direction. "Both lateral directions" or a "lateral direction" can have the same meaning as the leftward-rightward direction. These terms can be mixedly used hereinafter.

Figure 2:
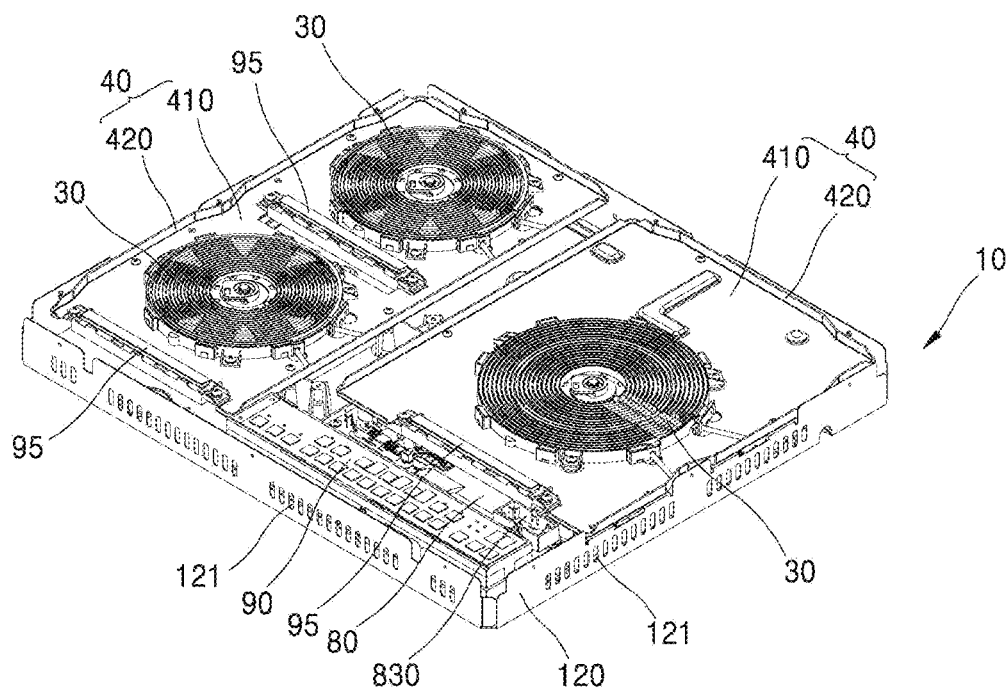
FIG. 2 is a perspective view of the electric range of FIG. 1 without a cover plate.
Figure 3:
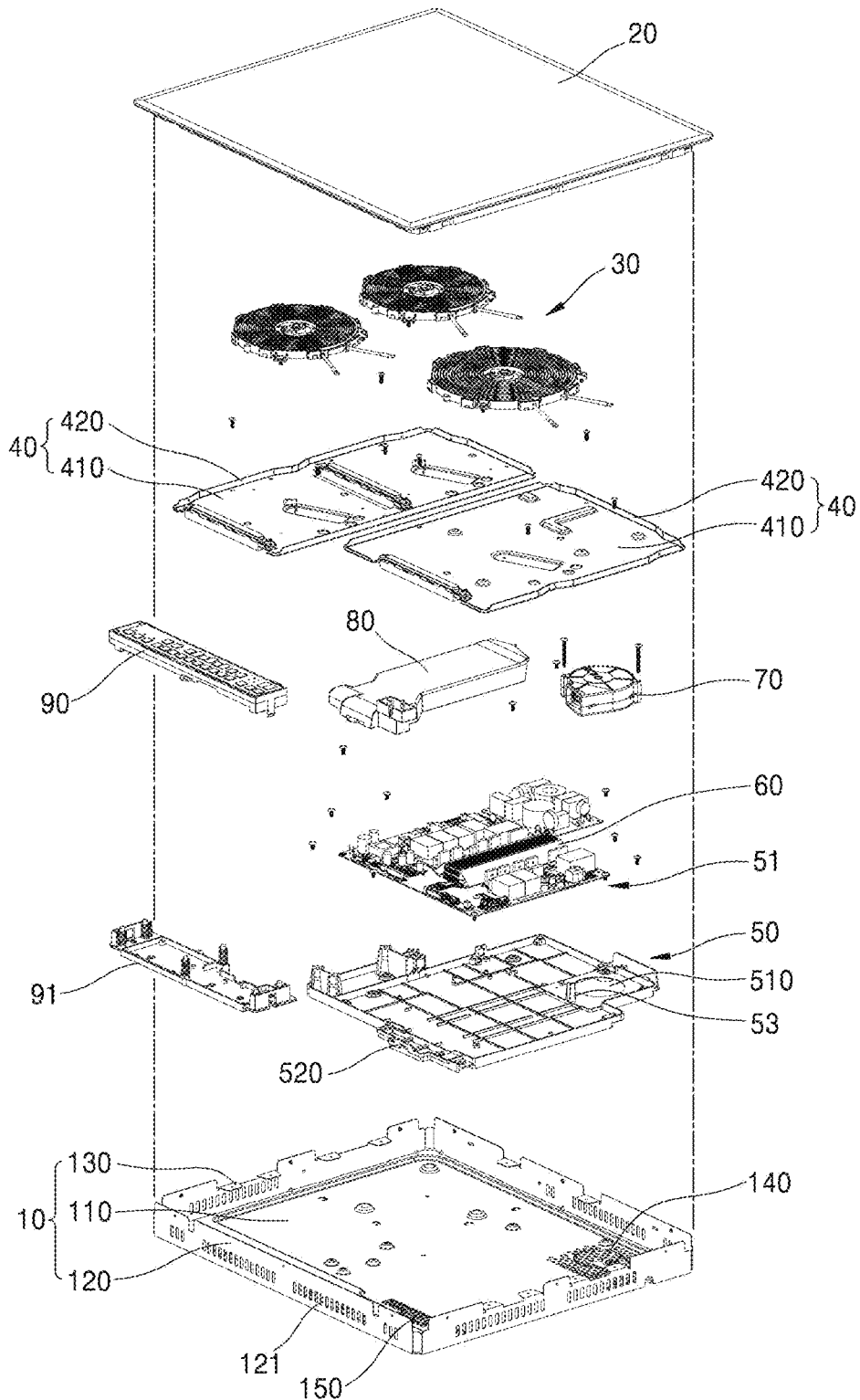
FIG. 3 is an exploded view of the electric range according to an embodiment.
Figure 4:
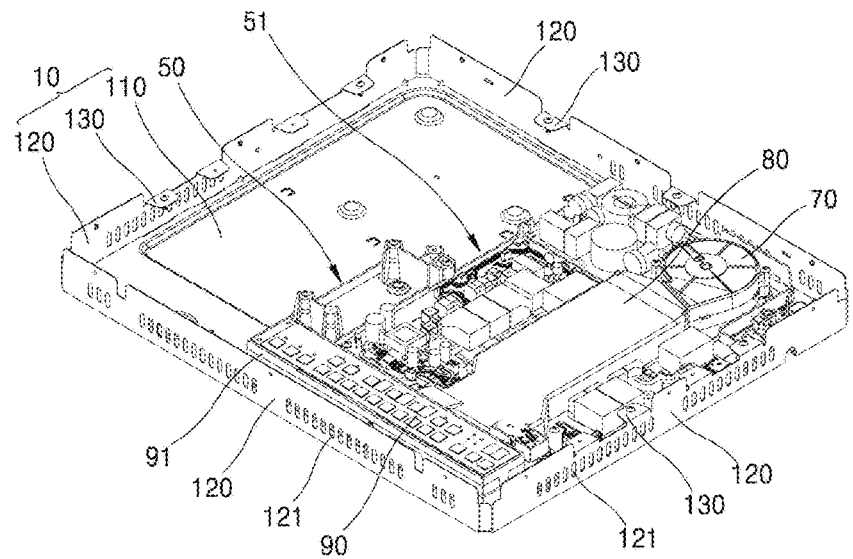
FIG. 4 is a perspective view of the electric range of FIG. 1 without some components.
Figure 5:
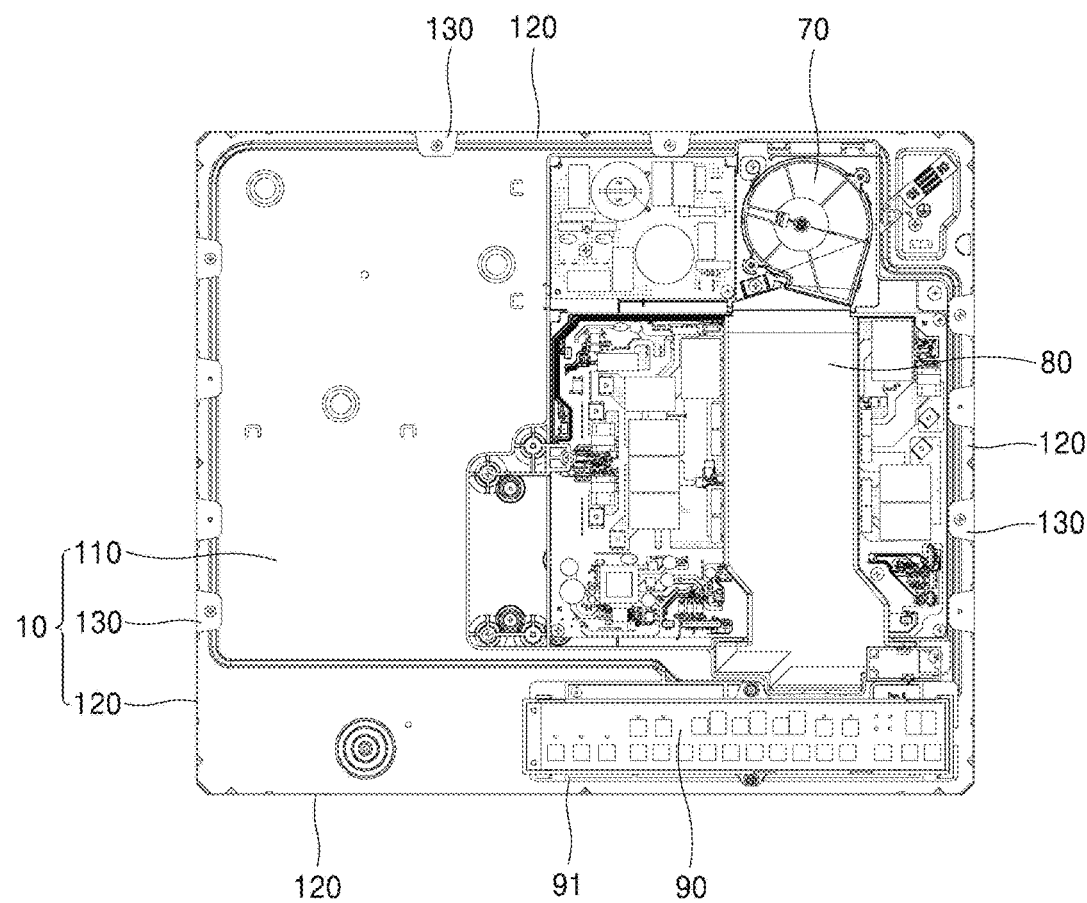
FIG. 5 is a front view of the electric range of FIG. 4.

FIG. 1 is a perspective view of an electric range according to an embodiment. FIG. 2 is a perspective view of the electric range of FIG. 1 without a cover plate. FIG. 3 is an exploded view showing the electric range according to an embodiment. FIG. 4 is a perspective view of the electric range of FIG. 1 without some components. FIG. 5 is a front view of the electric range of FIG. 4.

The electric range according to an embodiment may heat an object to be heated, based on induction heating. In this case, the object to be heated may be a cooking container made of a metallic material, such as stainless steel, or iron for example.

The induction heating method involves supplying high-frequency power to a working coil to generate a magnetic field around the working coil, and heating an object to be heated made of a metallic material, using eddy current produced by the generated magnetic field. That is, as high-frequency power is supplied to a working coil of a heating part or heater 30 having a structure in which the working coil is adjacent to a ferrite core, a magnetic field is generated around the working coil, and as an object to be heated is placed in an area of the generated magnetic field, eddy current is induced to the object to be heated by the magnetic field, and Joule's heat is generated by the eddy current, thereby heating the object to be heated. As the object to be heated, such as a cooking container, is heated, a food or other item (hereinafter, collectively "food") contained in the object to be heated is heated and cooked.

The electric range according to an embodiment may include a case 10, a cover plate 20, the heater 30, an upper bracket 40, and a base bracket 50. The case 10 may protect components constituting the electric range. For example, the case 10 may be made of aluminum; however, embodiments are not limited thereto. Additionally, the case 10 may be thermally insulated to suppress release of heat generated by the working coil of the heater 30 outside of the electric range.

The case 10 may store components, such as the heater 30, a working coil, the upper bracket 40, and a control board 90, for example, that constitute the electric range. An upper portion of the case 10 may be open, and the open portion of the case 10 may be closed by the cover plate 20. The case 10 may be entirely formed into a box by processing plate-shaped materials, for example.

The case 10 may include a first casing 110, a second casing 120, and a third casing 130. The first casing 110 may form a bottom surface of the case 10. The first casing 110 may support the above-described built-in components of the electric range.

The first casing 110 may have at least one vent through which air may flow, such as a printed circuit board 51 disposed in the first casing 110, and circuit element components mounted on the printed circuit board 51. The second casing 120 may be bent from the first casing 110, and form a lateral surface of the case 10. The second casing 120 may be bent from an edge of the first casing 110 in an upward-downward direction, and form the lateral wall of the electric range.

The second casing 120 may be disposed on each side of the first casing 110 entirely formed into a rectangle. The second casing 120 may help to improve the entire rigidity of the case 10. That is, the second casing 120 bent from the first casing 110 may suppress bending of the plate-shaped first casing 110 or damage caused by a weight of the built-in components or an external force.

The second casing 120 may further include a plurality of exhaust holes 121 formed into a slit. The exhaust holes 121 allow an inside and outside of the case 10 to communicate with each other, such that air flows through the exhaust holes 121, and helps to cool the components stored in the case 10.

The third casing 130 may be bent from the second casing 120 and support the upper bracket 40. The third casing 130 may be disposed on each side of the first casing 110.

A first upper plate 410 forming a bottom surface of the upper bracket 40 may be mounted on an upper surface of the third casing 130. The first upper plate 410 and the third casing 130 may be coupled to each other by a coupling tool, such as a bolt, for example.

The cover plate 20 may be coupled to the upper end of the case 10, and an object to be heated may be disposed on an upper surface of the cover plate 20. The cover plate 20 may close the upper portion of the case 10, which is open, to protect the components stored in the case 10.

An object to be heated may be placed on the upper surface of the cover plate 20, and a magnetic field produced in the heater 30 may reach the object to be heated by passing through the cover plate 20. The cover plate 20 may be made of a material including ceramics, for example; however, embodiments are not limited thereto.

An input interface may be disposed on the upper surface of the cover plate 20, and the input interface receives an input from a user. The input interface may be disposed in a predetermined area of the upper surface of the cover plate 20, and display a predetermined image.

The input interface may receive a touch input from the user, and the electric range may be driven based on the touch input received from the user. For example, the input interface may be a module for inputting a heating intensity or heating time, for example, desired by the user, and may be embodied as a physical button or a touch panel, for example. For example, the input interface may be a thin-film-transistor liquid-crystal display (TFT LCD); however, embodiments are not limited thereto.

The control board 90 may be disposed under the cover plate 20, and the control board 90 may input an operation instruction to the electric range. The control board 90 may be provided with a plurality of key switches. The user may control operations of the electric range by inputting an instruction to the control board 90 through the plurality of key switches.

For the electric range according to an embodiment, a board supporter 910 may be provided to stably mount the control board 90 in the case 10. The board supporter 910 may be mounted in the case 10, and the control board 90 may be mounted on the board supporter 910.

The board supporter 910 may be manufactured in a shape required to stably mount the board supporter 910 in the case 10 and reliably mount the control board 90 therein. The board supporter 910 may be made of plastics, for example, that ensures ease of injection molding and may be electrically insulated such that the board supporter 910 is easily manufactured, lightweight, and electrically insulated; however, embodiments are not limited thereto.

For the electric range according to an embodiment, an upper surface of the control board 90 may be in close contact with a lower surface of the cover plate 20. In this case, the control board 90 may be disposed in a position corresponding to a position of the input interface.

The control board 90 may be connected to the input interface, based on a capacitive touch input. Thus, as the user inputs a control instruction to the input interface, the control instruction may be input to the control board 90.

Additionally, a display may be disposed in a predetermined area of the upper surface of the cover plate 20. The display may display a drive state of the electric range.

A light display area may be formed on the upper surface of the cover plate 20. A light source unit 95 may be disposed under the cover plate 20. Light radiated from the light source unit 95 may be delivered to the user through the light display area.

In this case, the light display area and the light source unit 95 may be disposed in positions where the light display area and the light source unit 95 correspond to each other. When a plurality of light source units 95 is provided, a number of the light display areas provided on the upper surface of the cover plate 20 may be the same as a number of the light source units 95.

The electric range according to an embodiment may further include a cover bracket that supports the cover plate 20. An upper surface of the cover bracket may support the cover plate 20, and the covet bracket may be coupled to the second casing 120 of the case 10 by a coupling tool, such as a screw bolt, for example.

A plurality of heaters 30 may be disposed under the cover plate 20, and heat an object to be heated. In this embodiment, the plurality of heaters 30 may be based on induction heating. In another embodiment, the electric range may be embodied as a hybrid range in which a portion of a plurality of heaters 30 is based on induction heating, and a remaining portion is embodied as a highlight heating apparatus based on electrical resistance heating.

Hereafter, an electric range with the plurality of heaters 30, all of which is based on induction heating, is described.

The heater 30 may be mounted on the upper bracket 40, and in this embodiment, a total of three heaters is provided. However, the number of heaters 30 is not limited thereto. When a plurality of heaters 30 is provided, a plurality of upper brackets 40 may be provided to support the plurality of heaters 30 if necessary.

The heater 30 may be provided with a core frame, a working coil may be spirally wound around an upper surface of the core frame, and a ferrite core may be mounted on a lower surface of the core frame. Thus, as high-frequency power is supplied to the working coil, a magnetic field may be formed around the ferrite core, and the formed magnetic field may induce an eddy current to an object to be heated.

The upper bracket 40 may be disposed under the heater 30, and support the heater 30. In this embodiment, a plurality of upper brackets 40 may be provided. The upper bracket 40, for example, may be made of aluminum; however, embodiments are not limited thereto.

The upper bracket 30 may be formed into an approximate box shape by processing plate-shaped metal, for example, and serve as a structure that supports the heaters 30. The upper bracket 40 may include a first upper plate 410, and a second upper plate 420. The first upper plate 410 may form a bottom surface of the upper bracket 40, and the heater 30 may be mounted on the first upper plate 410.

The first upper plate 410 may be provided to cover the printed circuit board 51 disposed thereunder in the upward-downward direction. When a plurality of upper brackets 40 is provided, a single first upper plate 410 may cover the printed circuit board 51, or a plurality of first upper plates 410 may be coupled to each other to cover the printed circuit board 51, depending on a surface area of the printed circuit board 51.

The first upper plate 410 may block electromagnetic fields and electromagnetic waves generated from the heater 30 from reaching the printed circuit board 51, and elements mounted on the printed circuit board 51. That is, the upper bracket 40 may help to improve electromagnetic compatibility (EMC)) and electromagnetic interference (EMI) for the printed circuit board 51.

The second upper plate 420 may be bent from the first upper plate 410 in the upward-downward direction of the electric range. The second upper plate 420 may be bent from the edges of the first upper plate 410 in the upward-downward direction.

The second upper plate 420 may be disposed on each side of the first upper plate 410 entirely formed into a rectangle. When a plurality of upper brackets 40 is provided, the second upper plate 420 may be formed on each side of the first upper plate 410 except for a side of each upper bracket 40 that is adjacent to a side of another upper bracket 40.

The second upper plate 420 may help to improve the entire rigidity of the upper bracket 40. That is, the second upper plate 420 bent from the first upper plate 410 may suppress bending of the plate-shaped first upper plate 410 or damage that is caused by the weight of the built-in components including the heater 30 or an external force.

The light source unit 95 may be disposed on the upper bracket 40. For example, the light source unit 95 may be disposed on the printed circuit board 51 disposed under the upper bracket 40, and the upper bracket 40 may have an opening disposed in a position corresponding to the position of the light source unit 95.

As another embodiment, the light source unit 95 may be disposed on the upper bracket 40, and electrically connected to the printed circuit board 51 disposed thereunder. FIGS. 2 and 3 show that the light source unit 95 is disposed on the upper bracket 40 in the electric range according to an embodiment.

As described above, a light display area may be formed in a portion of the cover plate 20, which corresponds to the portion of the light source unit 95. The light source unit 95 may be provided in such a way that a plurality of LEDs are arranged in a line, for example.

The light source unit 95 may light up as the heater 30 operates, to inform a user whether the heater 30 operates. Alternatively, the light source unit 95 may change a shape, or color, for example, of the light of the plurality of LEDs to inform the user about an operation state of the electric range.

The number of the light source units 95 may be properly determined depending on the number of the heaters 30. FIGS. 2 and 3 show that three light source units 95 are provided for three heaters 30. However, the number of the light source units 95 is not limited thereto.

A base bracket 50 may be disposed under the upper bracket 40, and the printed circuit board 51 may be mounted on the base bracket 50. The base bracket 50 may include a bottom plate and a lateral plate. The bottom plate may form a bottom surface of the base bracket 50, and the printed circuit board 51 may be mounted on an upper surface of the bottom plate.

The lateral plate may be bent from the bottom plate in the upward-downward direction of the electric range. The lateral plate may be bent from an edge of the bottom plate in the upward-downward direction.

The lateral plate may be disposed on each side of the bottom plate that is entirely formed into a rectangle. When a plurality of upper brackets 40 is provided, the lateral plate may be formed on each side of the bottom plate except for the side of each upper bracket 40 that is adjacent to the side of another upper bracket 40.

The lateral plate may help to improve an entire rigidity of the base bracket 50. That is, the lateral plate bent from the bottom plate may suppress bending of the plate-shaped bottom plate or damage that is caused by the weight of the built-in components, such as the circuit board, for example, or an external force.

The base bracket 50 may be made of plastics, for example, that ensures ease of injection molding and may be electrically insulated such that the base bracket 50 is easily manufactured, lightweight, and electrically insulated; however, embodiments are not limited thereto.

The printed circuit board 51 may constitute a controller, receive power from an external power source, and be provided to communicate with an external device in a wired or wireless manner. The electric range may include a wireless communication circuit board for wireless communication with an external device, and the printed circuit board 51 may be electrically connected to the wireless communication circuit board.

The printed circuit board 51 may be electrically connected to the control board 90, and receive an instruction input by the user from the control board 90. The printed circuit board 51 may be electrically connected to the light source unit 95 and the working coil, and control their operations.

A heat sink 60 may be mounted on the printed circuit board 51. In addition, various types of active elements and passive elements for operating the electric range may be mounted on the printed circuit board 51, and the printed circuit board may be provided with an electric circuit.

The electric range according to an embodiment may further include the heat sink 60, an air blowing fan 70, and an air guide 80. The printed circuit board 51 may have elements mounted thereon, and the elements may generate heat as the electric range operates.

For example, switching elements in charge of control over the turn-on/turn-off of the heater 30 generate a large amount of heat, in the electric range. To suppress overheating-induced operational errors or failure of the electric range, the elements need to be cooled.

The electric range according to an embodiment may be provided with the heat sink 60, the air blowing fan 70, and the air guide 80 to cool the elements of the printed circuit board 51. Hereinafter, elements that generate a large amount of heat and need to be cooled are referred to as heat generating elements 60.

The heat sink 60 may protect components stored in the case 10 by cooling the inside of the case 10. The heat sink 60 may be mounted on the printed circuit board 51, and cool the printed circuit board 51. Additionally, the heat sink 60 may reduce heat induced by an electromagnetic interaction that is generated as the heater 30 operates.

For example, the heat sink 60 may include a plurality of cooling fins 610, and the air guide 80 may cover the plurality of cooling fins 610 and guide air to the plurality of cooling fins 610. The heat sink 60 and the plurality of cooling fins 610 are described with reference to the drawings, hereinafter.

The air blowing fan 70 may be mounted in the base bracket 50 and discharge air toward the heat sink 60. The air blowing fan 70 may electrically connect to the printed circuit board 51, and operations thereof may be controlled by the controller embodied by the printed circuit board 51.

Referring to FIG. 5, a guide wall may be formed at an outlet of the air blowing fan 70, through which air may be discharged, such that air blown by the air blowing fan 70 flows to the heat sink 60. The guide wall may guide a flow of the air in a direction in which the heat sink 60 is disposed. As the air blowing fan 70 operates, air in the case 10 may be blown to the heat sink 60, such that insides of the case 10 and the printed circuit board 51 are cooled by the heat sink 60.

Figure 6:
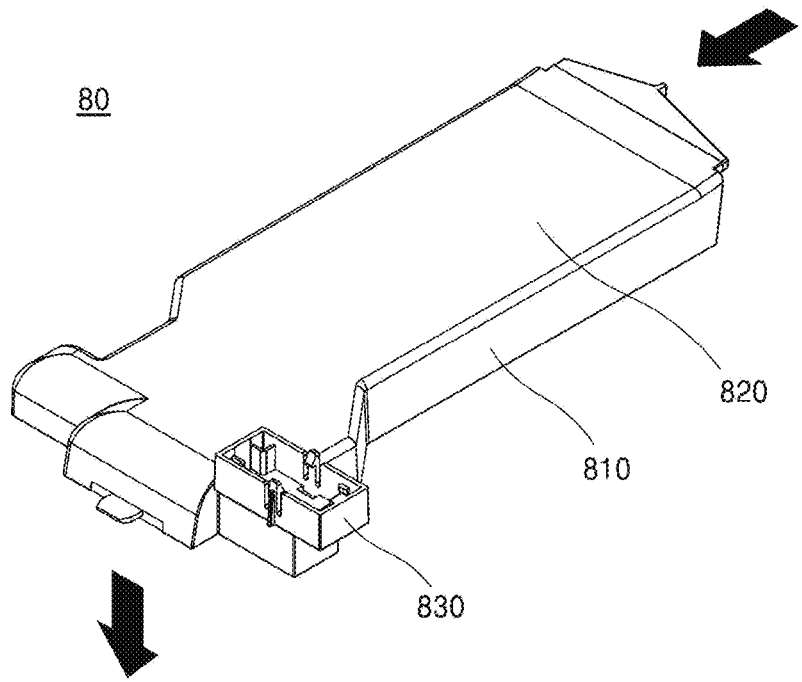
FIG. 6 is a perspective view of an air guide according to an embodiment.
Figure 7:
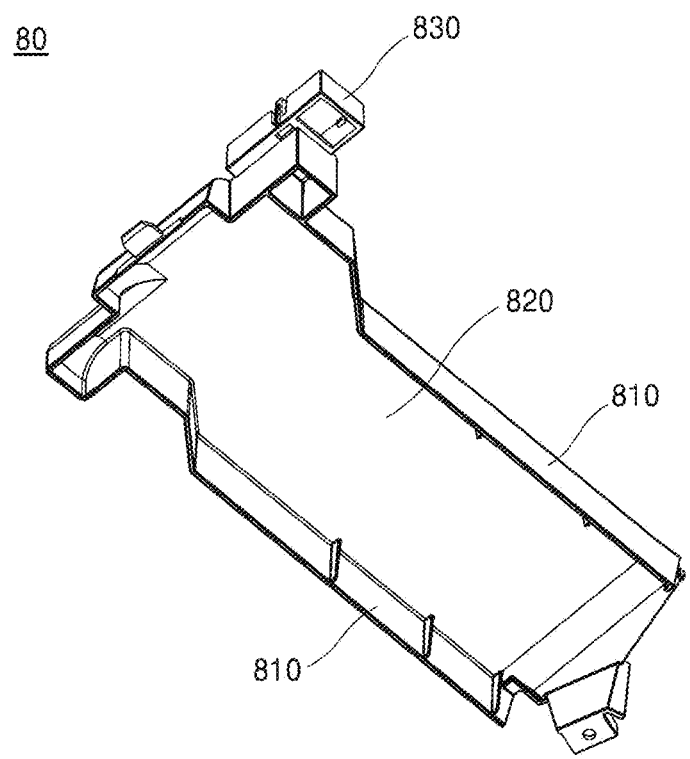
FIG. 7 is a perspective view of the air guide of FIG. 6 viewed in a different direction.
Figure 8:
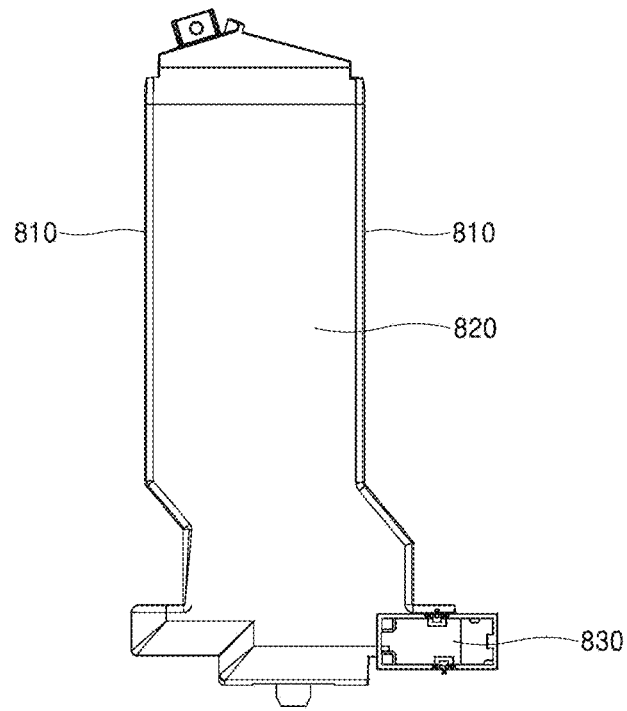
FIG. 8 is a plan view of the air guide according to an embodiment.
Figure 9:
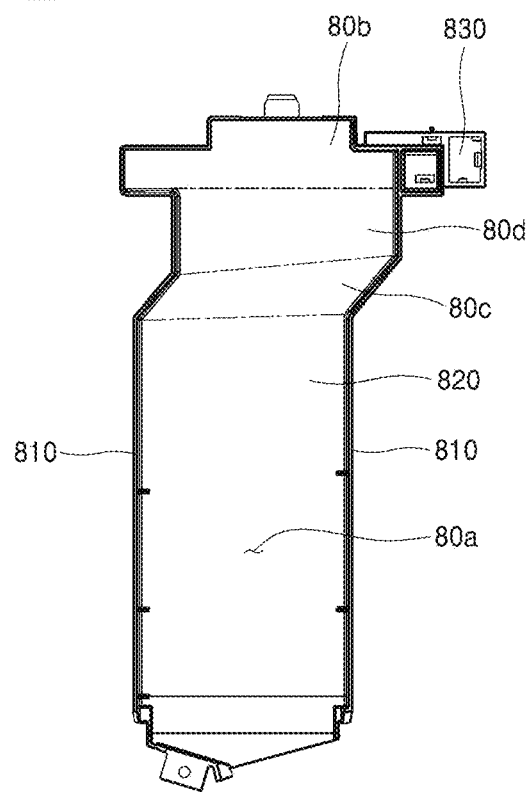
FIG. 9 is a bottom view of the air guide according to an embodiment.

FIG. 6 is a perspective view of an air guide according to an embodiment. FIG. 7 is a perspective view of the air guide of FIG. 6 viewed in a different direction. FIG. 8 is a plan view of the air guide according to an embodiment. FIG. 9 is a bottom view of the air guide according to an embodiment.

The air guide 80 may communicate with the air blowing fan 70, surround the heat sink 60, and form a flow path of air that cools the heat sink 60. The air guide 80 may be made of plastics, for example, that ensures ease of injection molding and may be electrically insulated; however, embodiments are not limited thereto.

The arrows in FIG. 6 indicate a direction in which air flows. Referring to FIG. 6, the air guide 80 may change the direction in which air flows. That is, the air guide 80 may direct air to flow in the frontward-rearward direction of the electric range at an inlet of the air guide 80 and allow air to flow in an upward-downward direction of the electric range at an outlet of the air guide 80.

Air discharged from the air blowing fan 70 may flow into the air guide 80 in the frontward-rearward direction of the electric range and flow from the air guide 80 in a downward direction of the electric range.

The air guide 80 may be detachably coupled to the base bracket 50. A rear of the air guide 80, adjacent to the air blowing fan 70, may be coupled to the base bracket 50 by a coupling tool, such as a screw bolt, for example. Additionally, a front of the air guide 80, at which air is discharged, may be shape-fitted to the base bracket 50, for example.

The air guide 80 may include a first lateral wall 810 and a second lateral wall. A space in which air flows may be formed by the first lateral wall 810 and the second lateral wall.

A pair of the first lateral wall 810 may be respectively disposed on both sides of the heat sink 60. An upper wall 820 may be coupled to an upper end of the pair of the first lateral walls 810 to cover the heat sink 60.

The space formed by the first lateral wall 810 and the second lateral wall becomes a flow space in which air flows. The heat sink 60 may be disposed in the flow space such that the heat sink 60 is cooled by air flowing in the flow space of the air guide 80.

The air guide 80 may include a communication substrate mounting part or mount 830. The communication substrate mount 830 may be disposed in a portion that protrudes laterally from an end portion of the upper bracket 40, in a state in which the air guide 80 is mounted on the electric range.

In the structure, a wireless communication circuit board mounted on the communication substrate mounting part or mount 830 may be disposed not to overlap the upper bracket 40 made of a metallic material in the upward-downward direction. Accordingly, the wireless communication circuit board may smoothly communicate with an external device, without being interfered with by jamming of the upper bracket 40 made of a metallic material.

Referring to FIG. 9, the air guide 80 may include a first area 80a, a second area 80b, a third area 80c, and a fourth area 80d. The first 80a to fourth 80d areas may be areas into which the flow space of air, formed in the air guide 80, is divided.

The first area 80a may communicate with the air blowing fan 70, and guide air such that the air flows in a lateral direction of the base bracket 50. In this case, the heat sink 60 may be disposed in the first area 80a. Air having flown into the air guide 80 from the air blowing fan 70 may flow into the heat sink 60 and cool the heat sink 60 while passing through the first area 80a of the air guide 80.

The second area 80b may be bent in an upward-downward direction of the base bracket 50 and guide air such that the air is discharged outward. The second area 80b may face a lower side of the electric range, and change a flow direction of the air having flow into the air guide 80. That is, the air guide 80 may guide air, discharged from the second area 80b, to a lower portion of the case 10 as the upper wall 820 is bent downward in the second area 80b.

With the above-described structure, air discharged from the air blowing fan 70 may flow into the air guide 80 in the frontward-rearward direction of the electric range, and flow from the air guide 80 in the downward direction of the electric range, as indicated by the arrows in FIG. 6.

The third area 80c and the fourth area 80d may be formed between the first area 80a and the second area 80b. The third area 80c may extend from the first area 80a, and change a flow direction of air having passed through the first area 80a. The third area 80c may be formed in such a way that the first lateral wall 810 is bent to have a slant in the end portion of the first area 80a.

That is, the first lateral wall 810 may be formed to have a slant with respect to the frontward-rearward direction of the air guide 80 at an inlet of the third area 80c of the air guide 80. With this structure, air may flow at a slant with respect to the frontward-rearward direction of the air guide 80 in the third area 80c.

As the third area 80c is formed as described above, elements on the printed circuit board 51 and the first lateral wall 810 do not meet each other in a portion where the air guide 80 overlaps the base bracket 50 in the upward-downward direction, when the air guide 80 is mounted on the base bracket 50. That is, the third area 80c may have a slant to avoid elements disposed on the printed circuit board 51.

The fourth area 80d may extend from the third area 80c, communicate with the second area 80b, and change a flow direction of air having passed through the third area 80c. The fourth area 80d may be formed in such a way that the first lateral wall 810 is bent to have a slant in the end portion of the third area 80c. That is, the first lateral wall 810 may be formed to have a slant with respect to the first lateral wall 810 of the third area 80c at an outlet of the third area 80c of the air guide 80. With this structure, air flowing in the air guide 80 may flow in the frontward-rearward direction of the air guide 80 again in the fourth area 80d.

Air having passed through the fourth area 80d may be directed out of the lower portion of the electric range through the second area 80b. Referring to FIG. 9, air, having flown in the air guide 80 in the frontward-rearward direction of the electric range to an outlet of the fourth area 80d, may change its flow direction in the second area 80b, flow in the downward direction of the electric range through an outlet of the second area 80b, and then be discharged out of the air guide 80.

The upper wall 820 may be bent downward in the second area 80b and guide air discharged from the second area 80b to the lower portion of the case 10. That is, air may be discharged from the air guide 80 through the second area 80b marked in FIG. 9, and flow in the downward direction of the electric range, that is, flow to the lower portion of the case 10.

Figure 10:
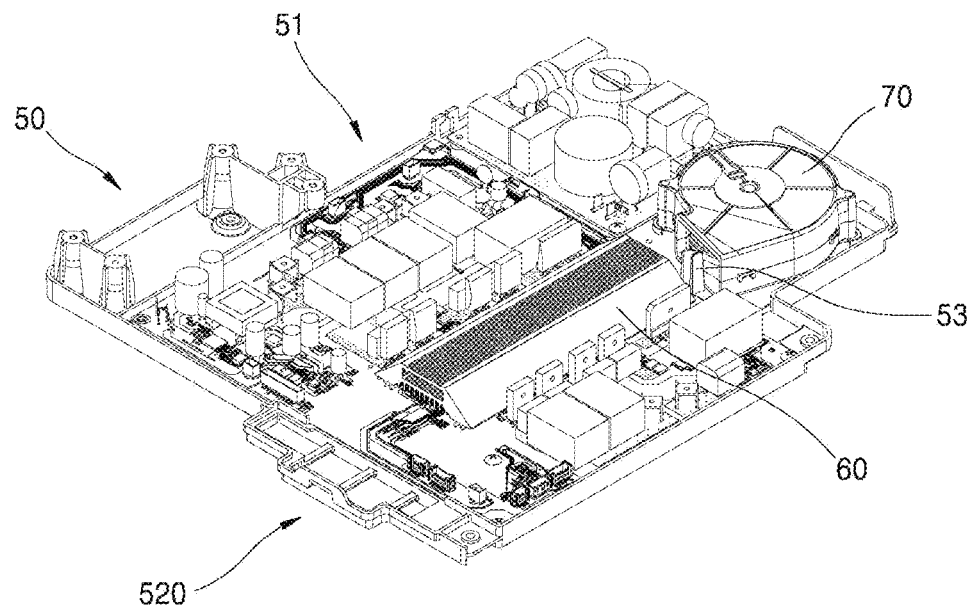
FIG. 10 is a perspective view showing a printed circuit board mounted on a base bracket according to an embodiment.
Figure 11:
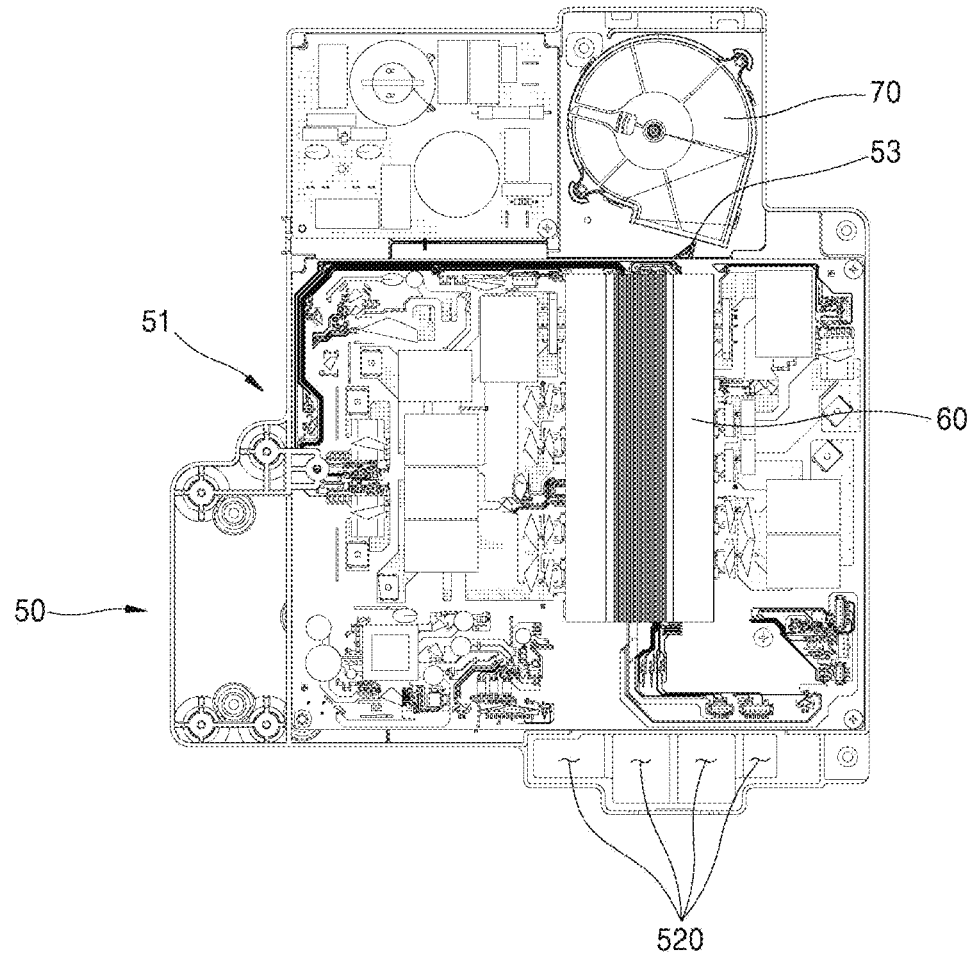
FIG. 11 is a plan view of the printed circuit board mounted on the base bracket of FIG. 10.
Figure 12:
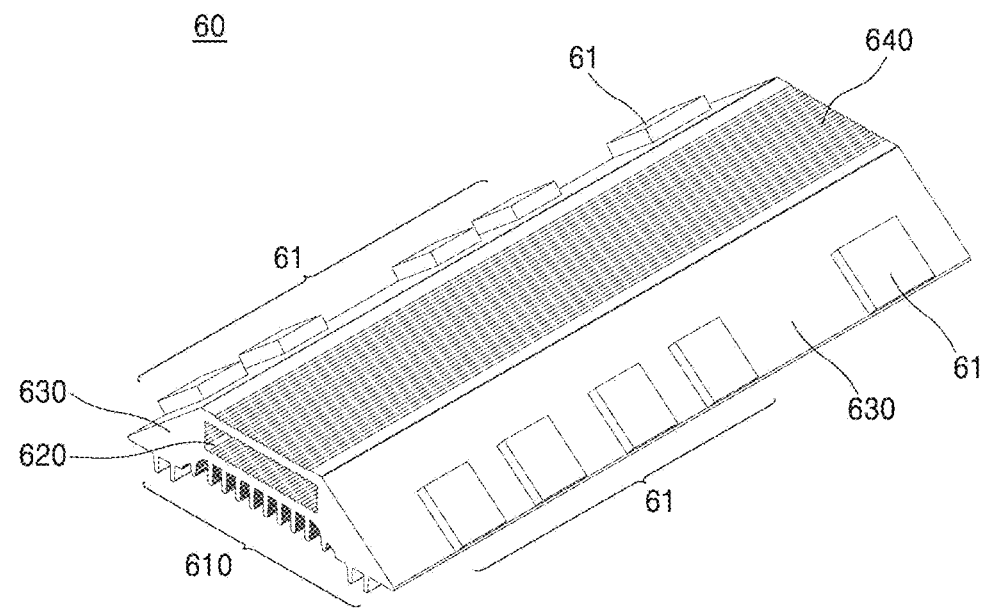
FIG. 12 is a perspective view of a heat sink according to an embodiment.
Figure 13:
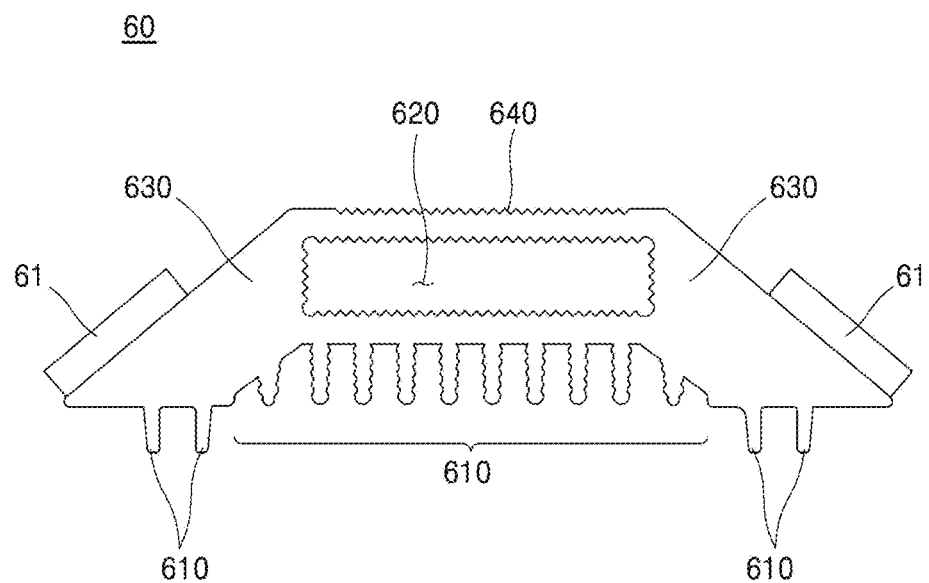
FIG. 13 is a front view of the heat sink according to an embodiment.

FIG. 10 is a perspective view showing a printed circuit board mounted on a base bracket according to an embodiment. FIG. 11 is a plan view of the printed circuit board mounted on the base bracket of FIG. 10. FIG. 12 is a perspective view of a heat sink according to an embodiment. FIG. 13 is a front view of the heat sink according to an embodiment.

A lengthwise direction of heat sink 60 may extend parallel with a direction in which air passing through air guide 80 flows. With this structure, a contact surface and contact time between the heat sink 60 and air flow increases, thereby improving a cooling efficiency of the heat sink 60. To correspond to the above-described disposition structure of the heat sink 60, a lengthwise direction of the air guide 80 may also extend approximately parallel with the direction in which air flows.

As illustrated in FIGS. 12 and 13, the heat sink 60 may include a plurality of cooling fins 610. The plurality of cooling fins 610 may protrude downward from the lower surface of the heat sink 60, and extend in a direction parallel with the lengthwise direction of the heat sink 60. The plurality of cooling fins 610 may help to increase a contact area between the heat sink 60 and air, thereby improving the cooling efficiency of the heat sink 60. Each of the plurality of cooling fins 610 may be spaced on the lower surface of the heat sink 60 in a widthwise direction of the heat sink 60 at predetermined intervals. In this case, the plurality of cooling fins 610 may be respectively formed at slanted part or portion 630 and plane parts or portions 640 of the heat sink 60.

Additionally, the heat sink 60 may include a flow pass 620 that passes through the heat sink 60 in the lengthwise direction and forms a flow path of air. The flow path 620 may extend in the lengthwise direction of the heat sink 60 in such a way that the flow path 620 passes through the plane portion 640 of the heat sink 60.

Like the plurality of cooling fins 610, the flow pass 620 may help to increase a contact area between the heat sink 60 and air, thereby improving the cooling efficiency of the heat sink 60. In this case, the flow pass 620 may have concave and convex portions on an inner surface thereof. The concave and convex portions may help to increase a contact surface between air and the heat sink 60, thereby improving the cooling efficiency of the heat sink 60.

The heat sink 60 may include the slanted portion 630 which is disposed on both sides of the heat sink 60 and the upper surface of which is inclined, and the plane portion 640 which is formed at a center of the heat sink 60 and has the flow pass 620, and the upper surface of which is flat.

The plane portion 640 may have concave and convex portions on the upper surface thereof. The concave and convex portions may help to increase a contact surface between air and the heat sink 60, thereby improving the cooling efficiency of the heat sink 60.

Additionally, some or all of the heat generating elements 61 included in the printed circuit board 51 may be mounted on the upper surface of the slanted portion 630. Accordingly, air blown by the air blowing fan 70 may cool the heat generating elements 61 mounted on the slanted portion 630 of the heat sink 60, and suppress overheating of the printed circuit board 51 effectively.

The slanted portion 630 may have a structure in which a thickness thereof decreases toward its edge. The structure of the slanted portion 630 may help the slanted portion 630 to play a similar role to the cooling fin 610, thereby cooling the heat generating elements 61 mounted on the slanted portion 630 effectively.

Figure 14:
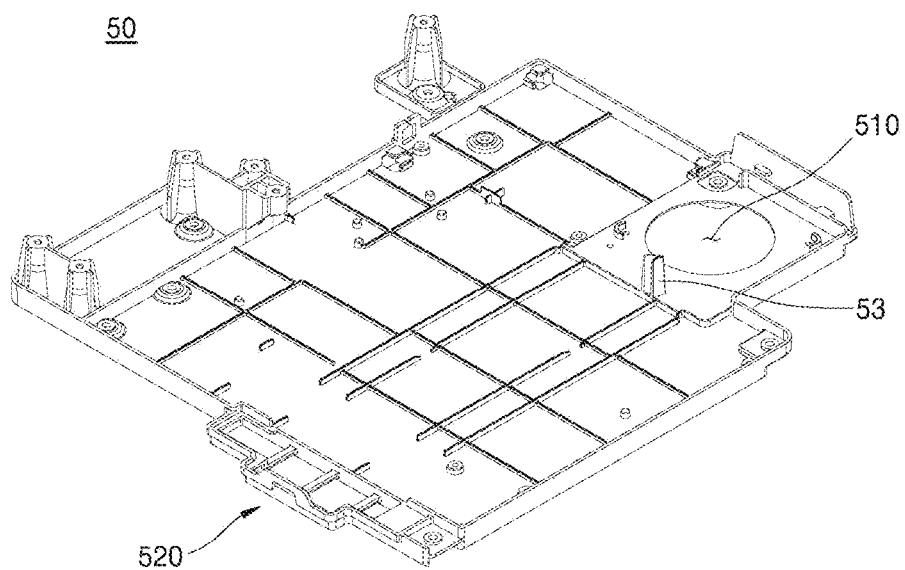
FIG. 14 is a perspective view of the base bracket according to an embodiment.
Figure 15:
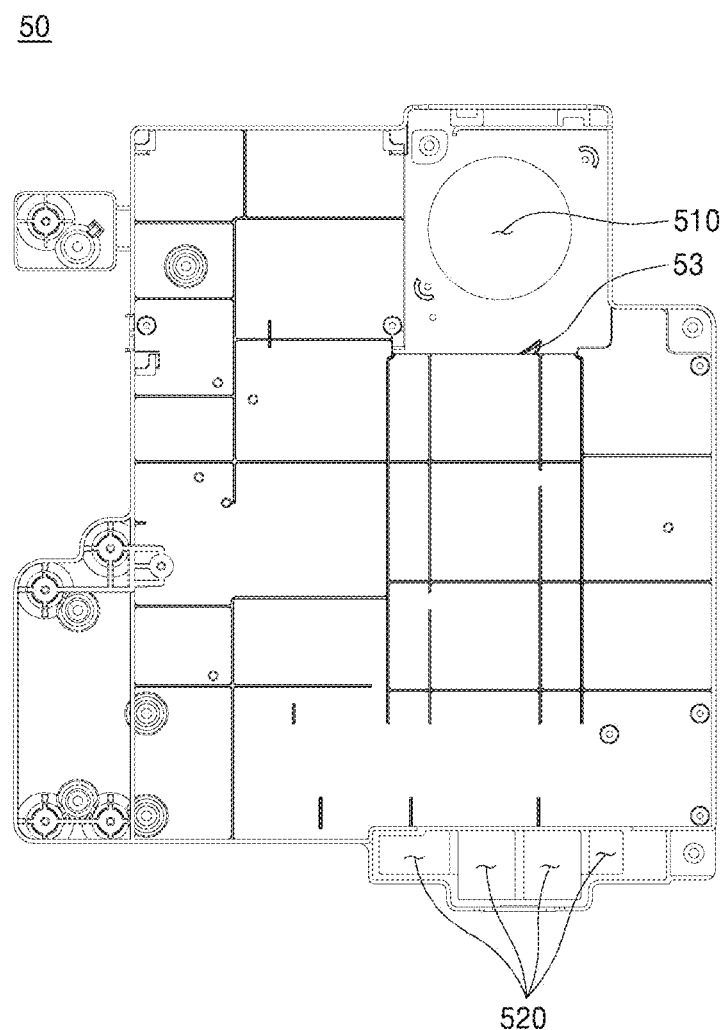
FIG. 15 is a plan view of the base bracket according to an embodiment.

FIG. 14 is a perspective view of the base bracket according to an embodiment. FIG. 15 is a plan view of the base bracket according to an embodiment.

The base bracket 50 may include a first vent part or vent 510 formed in a portion corresponding to the air blowing fan 70, and a second vent part or vent 520 formed in a portion corresponding to the fourth area 80d. In this case, the first vent 510 may have a shape corresponding to a shape of the air blowing fan 70, and the second vent 520 may have a shape corresponding to a shape of the fourth area 80d.

As the air blowing fan 70 operates, air may move upward from the first vent 510 and flow into the air blowing fan 70, and the flow direction of the air may be changed in the air blowing fan 70, flow in the frontward-rearward direction of the electric range, and pass through the air guide 80 and the heat sink 60. The flow direction of the air may change again at the outlet of the air guide 80, flow to the lower side of the electric range, pass through the second vent 520 and then be discharged out of the air guide 80.

A pair of slanted portions 630 may be provided for the heat sink 60, and each of the slanted portions 630 may be disposed in a position at which the pair of slanted portions 630 is symmetrically disposed with respect to a center of the plane portion 640. The heat generating elements 61 required to cool may be disposed on each slanted portion 630.

With this structure, the heat generating elements 61 may be disposed in mutually corresponding positions on both sides of the heat sink 60. To cool the heat generating elements 61 disposed on both sides of the heat sink 60 evenly, the flow direction of air discharged from the outlet of the air blowing fan 70 needs to be guided, and the air needs to flow evenly to both sides of the heat sink 60.

To allow the air to flow evenly to both sides of the heat sink 60, the electric range according to an embodiment may be provided with a vane part or vane 53.

The vane 53 may be disposed in a portion at which the air blowing fan 70 communicates with the air guide 80, and controls the flow direction of air in the air guide 80 to allow the air to flow evenly to both sides of the heat sink 60. For example, the vane 53 may be formed at the base bracket 50. As another example, the vane 53 may be integrated with the air guide 80 at the inlet of the air guide 80. As yet another embodiment, the vane 53 may be integrated with a housing of the air blowing fan 70 at the outlet let of the air blowing fan 70.

Figure 16:
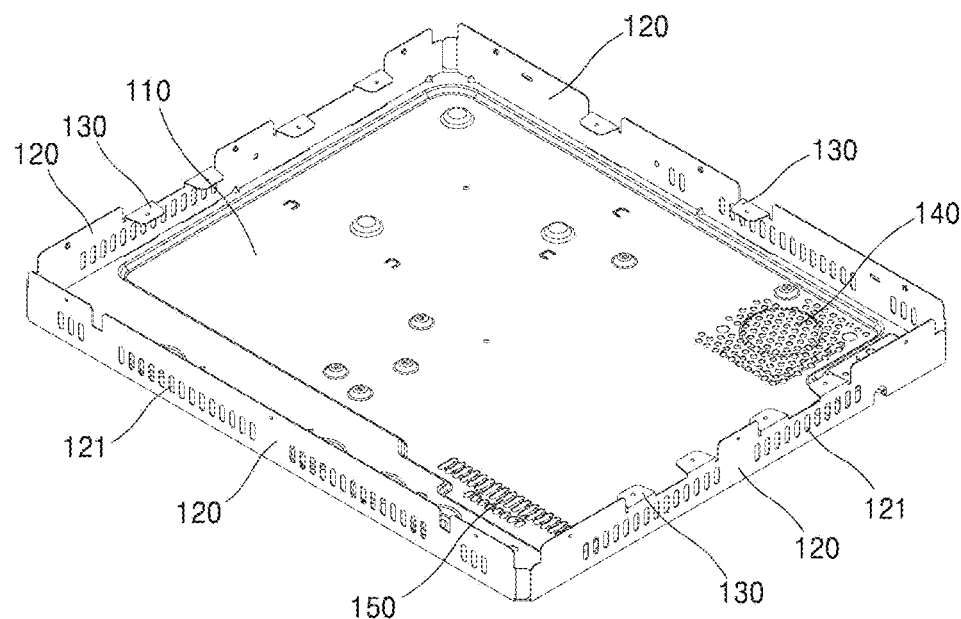
FIG. 16 is a perspective view of a case according to an embodiment.
Figure 17:
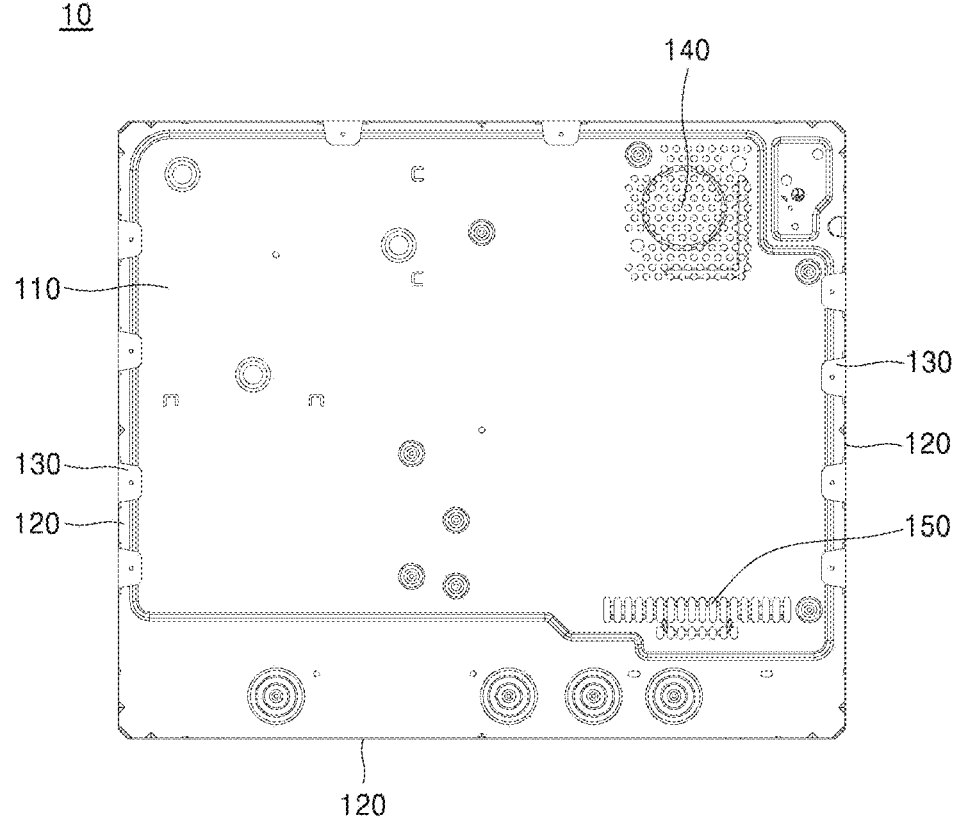
FIG. 17 is a plan view showing the case according to an embodiment.

FIG. 16 is a perspective view of a case according to an embodiment. FIG. 17 is a plan view of the case according to an embodiment.

The case 10 may include a first vent hole 140 and a second vent hole 150, to introduce and discharge air, blown by the air blowing fan 70, effectively.

The first vent hole 140 may be formed in a portion corresponding to the first vent 510, and the second vent hole 150 may be formed in a portion corresponding to the second vent 520. The first vent hole 140 and the second vent hole 150 may be formed in such a way that the first casing 110 forming the bottom surface of the case 10 is penetrated.

A plurality of the first vent hole 140 and a plurality of the second vent hole 150 may be provided. The plurality of first vent holes 140 and the plurality of second vent holes 150 may have a relatively small surface area, to suppress a flow of foreign substances into the electric range through the plurality of first vent holes 140 and the plurality of second vent holes 150 formed at the case 10 which is an outermost wall of the electric range.

Figure 18:
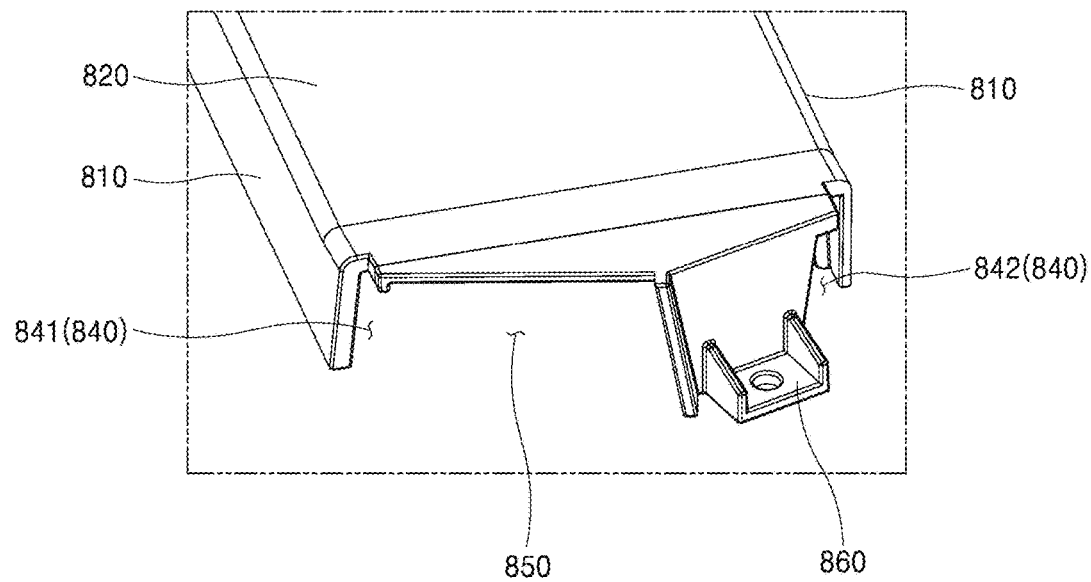
FIG. 18 is a partial enlarged view showing the air guide according to an embodiment.
Figure 19:
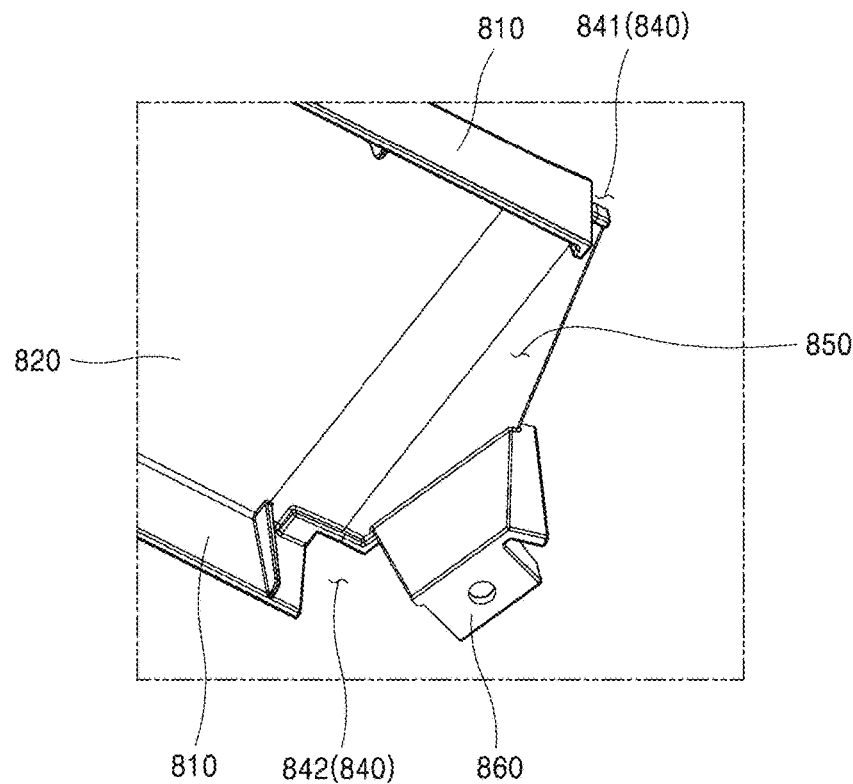
FIG. 19 is a partial enlarged view of FIG. 18, viewed in a different direction.

FIG. 18 is a partial enlarged view of the air guide according to an embodiment. FIG. 19 is a partial enlarged view of the air guide of FIG. 18, viewed in a different direction.

The heat generating elements 61 mounted on the heat sink 60, that is, the heat generating elements 61 disposed in the flow space of air, formed in the air guide 80, may be cooled effectively by air blown by the air blowing fan 70. However, various types of elements are mounted on the printed circuit board 51 outside of the air guide 80. As the electric range operates, heat is generated in the elements, causing the printed circuit board 51 to be excessively heated as a whole.

In an ordinary electric range, air flowing in the flow space of the air guide 80 does not flow to the printed circuit board 51 outside of the air guide 80. Thus, air blown by the air blowing fan 70 may not be used to cool the portion of the printed circuit board 51 outside of the air guide 80.

In this embodiment, the air guide 80 has a structure that helps to solve these problems. Hereafter, the air guide 80 according to an embodiment is described with reference to the drawings.

The air guide 80 according to an embodiment may be provided with an side outlet 840. The side outlet 840 may be formed in a portion of the air guide 80 that communicates with the air blowing fan 70 and discharge a portion of air flowing in from the air blowing fan 70 outward.

The side outlet 840 may discharge a portion of air that is blown by the air blowing fan 70 and flows into the flow space in the air guide 80, out of the air guide 80 before the air passes through the heat sink 60.

The air discharged through the side outlet 840 is diffused to the printed circuit board 51 except for a portion in which the air guide 80 covers the heat sink 60, and effectively cools the portion of the printed circuit board 51, disposed outside of the air guide 80, and elements disposed in the portion of the printed circuit board 51.

The side outlet 840 may include a first side outlet part (outlet) 841 and a second outlet (outlet) part 842. The first side outlet part 841 and the second side outlet part 842 may be disposed respectively on both sides of a guide coupling part or portion 860. The guide coupling part 860 is described hereinafter.

The air guide 80 may include a communicating part or portion 850 and the guide coupling part 860. The communicating part 850 may communicate with the outlet of the air blowing fan 70. Air blown by the air blowing fan 70 may flow into the air guide 80 through the outlet of the air blowing fan 70 and the communicating part 850.

The guide coupling part 860 may protrude from the air guide 80 and be coupled the air guide 80 to the base bracket 50. The guide coupling part 860 may couple the air guide 80 to the base bracket 50, at the inlet of the air guide 80, that is, the communicating part 850. The guide coupling part 860 may be mounted on the base bracket 50 by a coupling tool such, as a screw bolt, for example.

The first side outlet part 841 of the side outlet 840 may be disposed in a portion in which the first side outlet part 841 is connected to the communicating part 850. A portion of the second side outlet part 842 may be surrounded by the guide coupling part 860.

A (first) portion of air discharged from the air blowing fan 70 may flow into the air guide 80, and another (second) portion of the air may be discharged out of the air guide 80 through the first side outlet part 841 and the second side outlet part 842. With structure, the portion of air discharged from the outlet of the air blowing fan 70 is guided by the air guide 80 to pass through the heat sink 60, and the portion of the air is discharged out of the air guide 80 through the first side outlet part 841 and the second side outlet part 842 and cools a portion of the printed circuit board 51.

Figure 20:
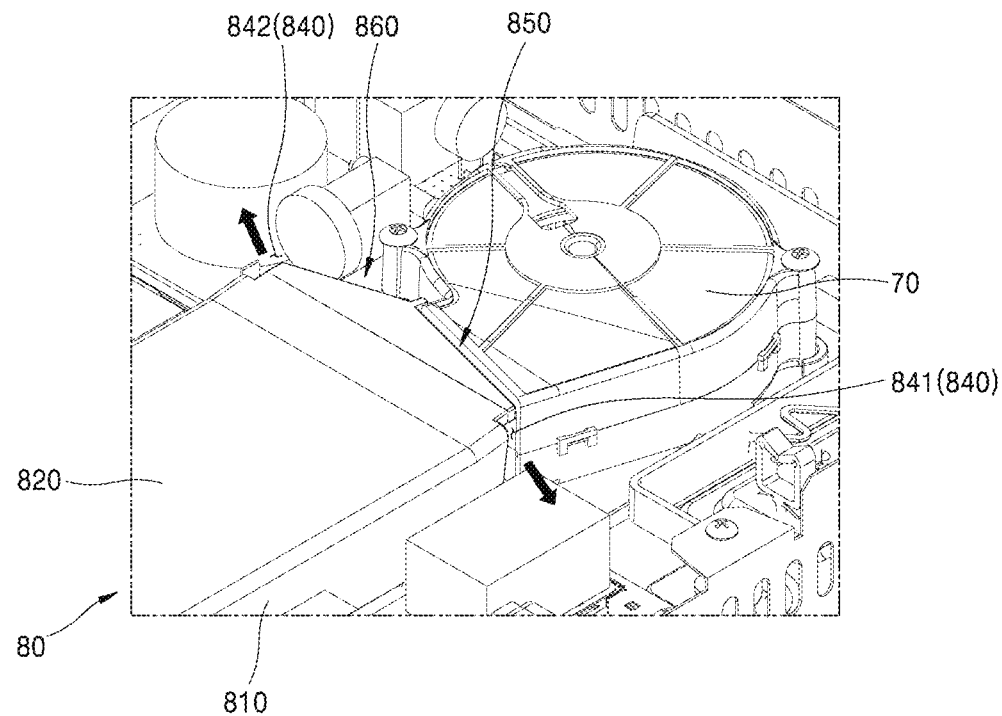
FIG. 20 is a partial enlarged view showing a portion in which the air guide according to an embodiment is coupled to an air blowing fan.
Figure 21:
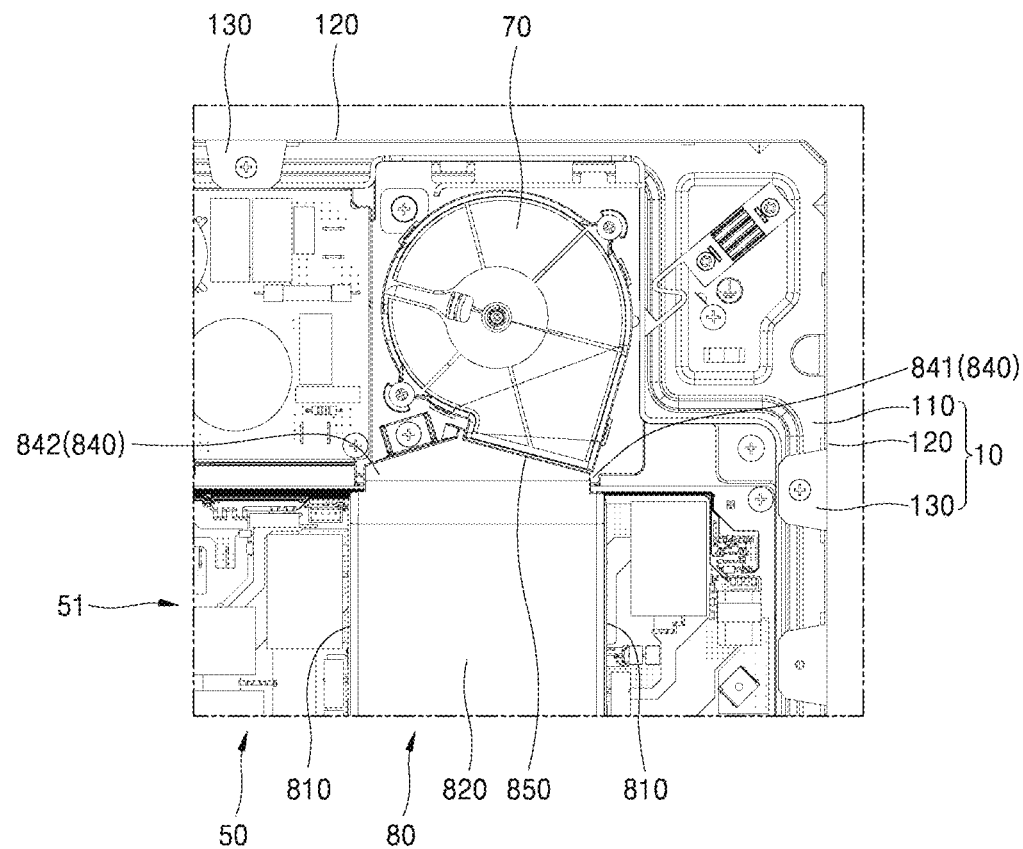
FIG. 21 is a plan view showing a portion in which the air guide according to an embodiment is coupled to an air blowing fan.

FIG. 20 is a partial enlarged view of a portion in which the air guide according to an embodiment is coupled to an air blowing fan. The arrows in FIG. 20 indicate a flow of air that is discharged from air guide 80 through side outlet 840. FIG. 21 is a plan view showing a portion in which the air guide according to an embodiment is coupled to an air blowing fan.

As illustrated in FIG. 20, the first side outlet part 841 and the second side outlet part 842 may be formed in such a way that a partial area of the air guide 80 is depressed to form an open portion between the air blowing fan 70 and the air guide 80 in the lateral direction of the electric range, when the air blowing fan 70 and the air guide 80 are disposed to communicate with each other. Additionally, the first side outlet part 841 and the second side outlet part 842 may be formed at approximately symmetrical positions with respect to the guide coupling part 860 such that air flows in opposite directions.

In the first side outlet part 841 and the second side outlet part 842, any one outlet part having a relatively high flow rate of air may have a relatively small cross-sectional area, and the other having a relatively low flow rate of air may have a relatively large cross-sectional area.

In FIGS. 18 to 21, a surface area of the second side outlet part 842 is greater than a surface area of the first side outlet part 841. This structure is created considering a flow velocity and flow rate of air in the first side outlet part 841 and the second side outlet part 842.

That is, in FIG. 21, a rotating fan disposed in the air blowing fan 70 may rotate around the upward-downward direction of the electric range. In this case, because of centrifugal force, a flow velocity and flow rate of air in a portion of the outlet of the air blowing fan 70, which is adjacent to the first side outlet part 841, may be greater than in a portion of the outlet of the air blowing fan 70, which is adjacent to the second side outlet part 842.

To make the flow rate of air discharged from the first side outlet part 841 approximately similar to the flow rate of air discharged from the second side outlet part 842, the surface area of the first side outlet part 841 may be greater than the surface area of the second side outlet part 842. That is, to make the flow rates of air similar in the first side outlet part 841 and the second side outlet part 842, relative sizes of the surface areas of the first side outlet part 841 and the second side outlet part 842 may be adjusted, considering the flow velocity and flow rate of air at the outlet of the air blowing fan 70. With this structure, air of a uniform flow rate may flow from the plurality of outlet parts to the printed circuit board 51.

Figure 22:
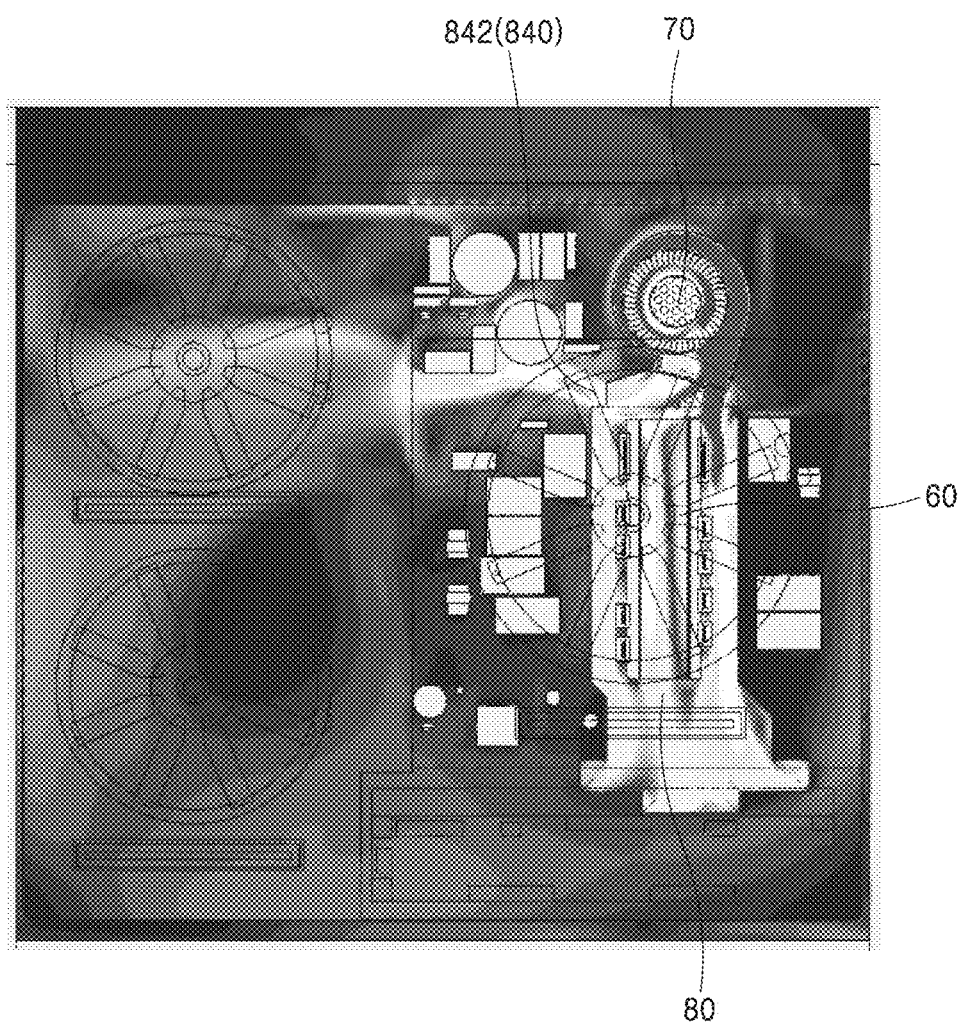
FIG. 22 is an image of air flowing in an air guide and an air blowing fan.

FIG. 22 is an image of air flowing in an air guide and an air blowing fan. FIG. 22 shows results of simulation based on computer programming. However, in FIG. 22, for clear observation, simulation was conducted for an air guide 80 provided only with the second side outlet part 842.

In FIG. 22, a flow velocity of air is relatively high in the relatively bright portion. Additionally, FIG. 22 shows a flow of air blown by the air blowing fan 70.

Referring to FIG. 22, most of the air discharged from the outlet of the air blowing fan 70 may flow into the air guide 80, and cool the heat sink 60 surrounded by the air guide 80 while flowing in the lengthwise direction of the air guide 80. Further, a portion of the air discharged from the outlet of the air blowing fan 70 may be discharged out of the air guide 80 through the second side outlet part 842, and diffused to the printed circuit board 51 outside of the air guide 80. The air discharged out of the air guide 80 through the second side outlet part 842 may cool the printed circuit board 51 effectively while being diffused to the printed circuit board 51.

In this embodiment, a portion of the air discharged from the air blowing fan 70 may cool the printed circuit board 51 and elements mounted on the printed circuit board 51 outside of the air guide 80 through the side outlet 840 included in the air guide 80. Thus, the air blowing fan 70 may be used to effectively cool the entire printed circuit board 51 as well as the heat sink 60, thereby suppressing overheating of the printed circuit board 51.

Embodiments disclosed herein provide an electric range with structure that helps to effectively suppress overheating of a printed circuit board mounted in the electric range. Embodiments disclosed herein further provide an electric range with structure that helps to effectively cool a printed circuit board entirely by blowing air with an air blowing fan mounted in the electric range. Embodiments disclosed herein furthermore provide an electric range with structure that is capable of supplying a portion of air from an air guide, which guides a flow of air to cool a heat sink, to another portion of the printed circuit board except for the heat sink.

Advantages are not limited to the above advantages, and other advantages that are not mentioned above can be clearly understood from the description and can be more clearly understood from the embodiments set forth herein. Additionally, advantages can be realized via means and combinations thereof that are described in the appended claims.

An electric range according to embodiments disclosed herein may include a case, a cover plate coupled to an upper end of the case and allowing an object to be heated to be placed on an upper surface thereof, a heating part or heater that is disposed under the cover plate and heats an object to be heated, an upper bracket that is disposed under the heating part and supports the heating part, a base bracket disposed under the upper bracket and on which a printed circuit board is mounted, a heat sink mounted on the printed circuit board, an air blowing fan that is mounted on the base bracket and discharges air toward the heat sink, and an air guide that communicates with the air blowing fan, surrounds the heat sink, and forms a flow path of air that cools the heat sink. The air guide may include a first lateral wall and a second lateral wall, and a flow space in which air flows may be formed by the first lateral wall and the second lateral wall.

A pair of first lateral walls may be respectively disposed on both sides of the heat sink. An upper wall may be coupled to an upper end of the pair of first lateral walls and cover the heat sink.

The air guide may include a first area, a second area, a third area, and a fourth area. The first to fourth areas may be areas into which the flow space, formed by the air guide, is divided. The first area may communicate with the air blowing fan, and guide air such that the air flows in the lateral direction of the base bracket. The heat sink may be disposed in the first area.

Air having flowed to the air guide from the air blowing fan may flow into the heat sink and cool the heat sink while passing through the first area of the air guide.

The second area may be bent in the upward-downward direction of the base bracket, and guide air such that the air is discharged outward. The second area may be formed to face a lower side of the electric range such that a flow direction of the air having flowed to the air guide changes. That is, the upper wall may be bent downward in the second area of the air guide, and guide air discharged from the second area such that the air flows to the lower portion of the case. With this structure, air discharged from the air blowing fan may flow into the air guide in the frontward-rearward direction of the electric range, and flow from the air guide in the downward direction of the electric range.

The third area may extend from the first area, and change the flow direction of air having passed through the first area. For the air guide, the first lateral wall may be bent to have a slant in the end portion of the first area, to form the third area.

That is, the first lateral wall may be formed to have a slant with respect to the frontward-rearward direction of the air guide in the third area of the air guide. With this structure, air may flow at a slant with respect to the frontward-rearward direction of the air guide in the third area.

The fourth area may extend from the third area, communicate with the second area, and change the flow direction of air having passed through the third area. For the air guide, the first lateral wall may be bent to have a slant in the end portion of the third area, to form the fourth area.

That is, the first lateral wall may be formed to have a slant with respect to the first lateral wall of the third area at the outlet of the third area of the air guide. With this structure, air flowing in the air guide may flow in the frontward-rearward direction of the air guide again in the fourth area.

A lengthwise direction of the heat sink may be parallel with the flow direction of air passing through the air guide. With this structure, a contact surface and contact time between the heat sink and air flow may increase, thereby improving a cooling efficiency of the heat sink.

The heat sink may include a plurality of cooling fins. The plurality of cooling fins may protrude downward from the lower surface of the heat sink and be formed in a direction parallel with the lengthwise direction of the heat sink.

The heat sink may be provided with a flow path that passes through the heat sink in a lengthwise direction and forms a flow path of air. The flow path may be formed in the lengthwise direction of the heat sink, and pass through a plane part or portion of the heat sink.

The heat sink may include a slant part or portion which is disposed on both sides of the heat sink and the upper surface of which is inclined, and a plane part or portion which is formed at a center of the heat sink and has the flow path, and the upper surface of which is flat.

Additionally, some or all of the heat generating elements included in the printed circuit board may be mounted on the upper surface of the slant part. Accordingly, air blown by the air blowing fan may cool the heat generating elements mounted on the slant part of the heat sink, and suppress overheating of the printed circuit board effectively.

The base bracket may include a first vent part or vent formed in a portion corresponding to the portion of the air blowing fan, and a second vent part or vent formed in a portion corresponding to the fourth area. The first vent part may have a shape corresponding to a shape of the air blowing fan, and the second vent part may have a shape corresponding to a shape of the fourth area.

The case may include a first vent hole and a second vent hole, to introduce and discharge air, blown by the air blowing fan, effectively. The first vent hole may be formed in a portion corresponding to the portion of the first vent part, and the second vent hole may be formed in a portion corresponding to the portion of the second vent part. The first vent hole and the second vent hole may be formed in such a way that the first casing forming the bottom surface of the case is penetrated.

The air guide may be provided with an side outlet. The side outlet may be formed in a portion in which the air guide communicates with the air blowing fan, and discharge a portion of air flowing from the air blowing fan outward.

The side outlet may be provided to discharge a portion of air that is blown by the air blowing fan and then flows into the flow space in the air guide, out of the air guide before the air passes through the heat sink.

The air guide may include a communicating part or portion and a guide coupling part or portion. The communicating part may communicate with the outlet of the air blowing fan. Air blown by the air blowing fan may flow into the air guide through the outlet of the air blowing fan and the communicating part.

The guide coupling part may protrude from the air guide and couple the air guide to the base bracket. The guide coupling part may couple the air guide to the base bracket, at the inlet of the air guide, that is, the communicating part.

A first side outlet part or outlet of the side outlet may be disposed in a portion in which the first side outlet part is connected to the communicating part. A portion of a second side outlet part or outlet may be surrounded by the guide coupling part.

The first side outlet part and the second side outlet part may be formed in such a way that a partial area of the air guide is depressed to form an open portion between the air blowing fan and the air guide in the lateral direction of the electric range, when the air blowing fan and the air guide are disposed to communicate with each other. A (first) portion of air discharged from the air blowing fan may flow into the air guide, and another (second) portion of the air may be discharged out of the air guide through the first side outlet part and the second side outlet part. With this structure, the portion of air discharged from the outlet of the air blowing fan may be guided by the air guide to pass through the heat sink, and the portion of the air may be discharged out of the air guide through the first side outlet part and the second side outlet part and cool a portion of the printed circuit board.

In the first side outlet part and the second side outlet part, any one outlet part having a relatively high flow rate of air may have a relatively small cross-sectional area, and the other having a relatively low flow rate of air may have a relatively small cross-sectional area.

An electric range according to embodiments disclosed herein may include a case, a heating part or heater that is disposed in the case and heats an object to be heated, a base bracket that is disposed under the heating part and on which a printed circuit board is mounted, a heat sink mounted on the printed circuit board, an air blowing fan that is mounted on the base bracket and discharges air toward the heat sink, and an air guide that communicates with the air blowing fan, surrounds the heat sink, and forms a flow path of air that cools the heat sink. The air guide may include an side outlet that is formed in a portion in which the air guide communicates with the air blowing fan and discharges a portion of air flowing from the air blowing fan outward, a communicating part or portion that communicates with an outlet of the air blowing fan, and a guide coupling part or portion that protrudes from the air guide and couples the air guide to the base bracket.

In the electric range according to embodiments disclosed herein, air discharged through the side outlet included in the air guide may be diffused to the printed circuit board except for a portion in which the air guide covers the heat sink, and effectively cool a portion of the printed circuit board disposed outside of the air guide, and elements disposed in the portion of the printed circuit board.

In the electric range according to embodiments disclosed herein, to make flow rates of air similar in the first side outlet part and the second side outlet part that form the side outlet, relative sizes of surface areas of the first side outlet part and the second side outlet part may be adjusted, considering a flow velocity and flow rate of air at the outlet of the air blowing fan. With this structure, air of a uniform flow rate may flow from the plurality of outlet parts to the printed circuit board.

In the electric range according to embodiments disclosed herein, a portion of air discharged from the air blowing fan may cool the printed circuit board and elements mounted on the printed circuit board outside of the air guide through the side outlet included in the air guide. Thus, the air blowing fan may be used to effectively cool the entire printed circuit board as well as the heat sink, suppressing overheating of the printed circuit board.

Embodiments are described above with reference to a number of illustrative embodiments thereof. However, embodiments are not limited to the embodiments and drawings set forth herein, and numerous other modifications and embodiments can be devised by one skilled in the art within the technical scope. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations according to an or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper", for example, may be used herein for ease of description to describe the relationship according to an element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition according to an or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric range, comprising:
    a case;
    a cover plate coupled to an upper end of the case and on an upper surface of which an object to be heated is placed;
    a heat sink;
    an air blowing fan, wherein the air blowing fan is configured to discharge air toward the heat sink; and
    an air guide that communicates with the air blowing fan, surrounds the heat sink, and forms a flow path of air that cools the heat sink, wherein the air guide includes a side outlet formed in a portion at which the air guide communicates with the air blowing fan, wherein the air guide is configured to discharge a portion of air flowing from the air blowing fan outward, wherein the air guide comprises:
    a communicating portion in communication with an outlet of the air blowing fan; and
    a guide coupling portion that protrudes from the air guide, wherein the side outlet comprises:
    a first side outlet part disposed at a portion at which the first side outlet part is connected to the communicating portion; and
    a second side outlet part partially surrounded by the guide coupling portion, wherein the first side outlet part and the second side outlet part are formed at opposite positions with respect to the guide coupling portion such that air flows in different directions and
    wherein the guide coupling portion couples the air guide to a base bracket on which a printed circuit board is mounted via a coupling tool.

2. The electric range of claim 1, wherein a first portion of air discharged from the outlet of the air blowing fan is guided by the air guide and passes through the heat sink, and a second portion of the air is discharged out of the air guide through the first side outlet part and the second side outlet part.

3. The electric range of claim 1, wherein the air guide comprises:
    a first area in communication with the air blowing fan and configured to guide air to flow in a lateral direction of the base bracket;
    a second area bent in an upward-downward direction of the base bracket and configured to guide air to be discharged outward;
    a third area that extends from the first area and changes a flow direction of air having passed through the first area; and
    a fourth area that extends from the third area, communicates with the second area, and changes a flow direction of air having passed through the third area.

4. The electric range of claim 3, wherein the air guide comprises:
    a pair of first lateral walls disposed respectively on both sides of the heat sink; and
    an upper wall that is coupled to an upper end of the pair of first lateral walls and covers the heat sink.

5. The electric range of claim 4, wherein the pair of first lateral walls is bent to have a slant in an end portion of the first area, to form the third area, and the pair of first lateral walls is bent to have a slant in an end portion of the third area, to form the fourth area.

6. The electric range of claim 4, the upper wall is bent downward in the second area and guides air discharged from the second area to flow to a lower portion of the case.

7. The electric range of claim 3, wherein the base bracket comprises:
    a first vent formed in a portion corresponding to the air blowing fan; and
    a second vent formed in a portion corresponding to the fourth area.

8. The electric range of claim 7, wherein the case comprises:
    a plurality of first vent holes formed in a portion corresponding to the first vent; and
    a plurality of second vent holes formed in a portion corresponding to the second vent.

9. The electric range of claim 1, wherein a lengthwise direction of the heat sink extends parallel with a flow direction of air passing through the air guide.

10. The electric range of claim 9, wherein the heat sink comprises a plurality of cooling fins that protrudes downward from a lower surface of the heat sink and extends in a direction parallel with the lengthwise direction of the heat sink.

11. The electric range of claim 10, wherein the heat sink is provided with a flow path that passes through the heat sink in the lengthwise direction to form a flow path of air.

12. The electric range of claim 11, wherein the heat sink comprises:
    a slanted portion disposed on both sides of the heat sink, wherein an upper surface of the slant portion is inclined; and
    a plane portion formed at a center of the heat sink, wherein the center of the heat sink comprises the flow path, and wherein an upper surface of the plane portion is flat.

* * * * *